Oct. 26, 1965  M. HALPERN  3,214,025
ADAPTER FOR LABORATORY FILTER EQUIPMENT
Filed March 30, 1962  2 Sheets-Sheet 1

INVENTOR.
MICHEL HALPERN
BY
ATTORNEY

Oct. 26, 1965    M. HALPERN    3,214,025
ADAPTER FOR LABORATORY FILTER EQUIPMENT
Filed March 30, 1962    2 Sheets-Sheet 2
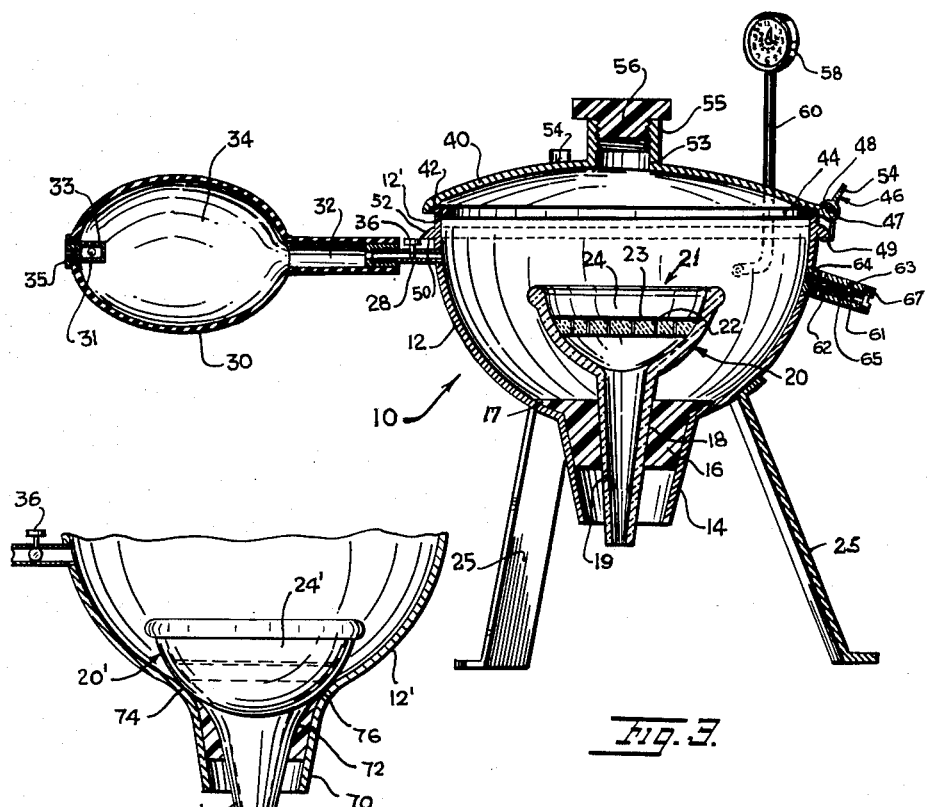
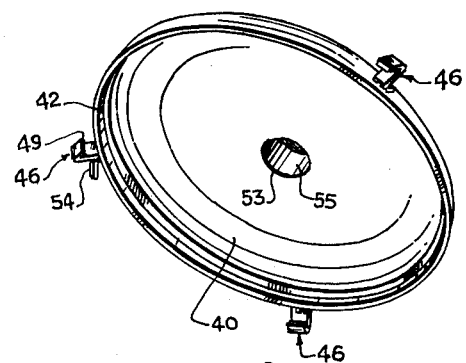
INVENTOR.
MICHEL HALPERN
BY
*ATTORNEY*

United States Patent Office 3,214,025
Patented Oct. 26, 1965

3,214,025
ADAPTER FOR LABORATORY FILTER EQUIPMENT
Michel Halpern, 221 Orchard St., Elizabeth, N.J.
Filed Mar. 30, 1962, Ser. No. 183,951
1 Claim. (Cl. 210—250)

This invention relates to an adapter for laboratory filter equipment, used for both vacuum and gravity, under pressure.

It has been known heretofore to provide filter apparatus with means for applying suction to the apparatus to increase the speed of filtration. Such apparatus necessarily exposes the filtrant to the pressure of the outside atmosphere.

It is a known fact that in every laboratory or in the large proportion of laboratories, suction filtration is used and the suction is supplied by water aspirators, the suction being produced by water passing through a device called an "aspirator." This means that the reduced pressure produced depends on the pressure of the water passing through the aspirator. It is a known fact that precautions have to be taken to cope with the fluctuations of water pressure. It happens often that unexpected loss of pressure in the water supply will cause loss of suction that will cause the water to be sucked back into the tubing connecting the receiver of the filtrant with the aspirator. It frequently happens that if this is not noticed by the operator in time, the water will fill the trap and will even enter the receiver, and if the loss of pressure in the water supply lasts too long, will cause contamination of the already filtered material, causing difficulties depending on the material to be filtered. Even the use of automatic valves is ineffectual in many cases because sometimes the loss of pressure in the water supply is not large enough to actuate the valve to cause closing of the connecting line to prevent sucking back of water.

The use of mechanical pumps to produce suction is troublesome in cases where corrosive liquids are processed, such as where acid solutions, etc., or volatile solvent are filtered. In such cases, the acid will corrode the pump unless a trap is installed, and the volatile solvent will contaminate the oil in the pump. Furthermore, when liquids saturated with dissolved solids are to be purified or when solids are to be processed further by removing the "mother liquor" by filtration, the application of suction to this saturated liquid will cause evaporation of the solvent. This evaporation will cause cooling and the cooling will cause further precipitation of solids, possibly impurities that are intended to remain in solution in order that the solids left behind in the filter funnel become as pure as possible. Also, the filter will be clogged with precipitate.

It is the principal object of the present invention to overcome the above disadvantages by providing an adapter that makes it possible to perform the filtration under pressure.

Another object of the invention is to provide an adapter that makes it possible for users of suction filters to convert such suction filters into pressure filters whenever desirable.

A further object is to provide an adapter of this type that is inexpensive, economical to manufacture, highly efficient for the purposes intended and that can be sold at a reasonable cost.

Another advantage of the present invention is that the adapter is a saver of water when water is used for producing suction in the filter.

Still another object of the invention is to provide an adapter with a cover that can be taken off or put on within seconds.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 3 is a sectional view taken on the line 3—3 of FIG. 2.

FIG. 4 is a perspective view of a cover forming part of the adapter.

FIG. 5 is a fragmentary view similar to FIG. 3 of a modified form of funnel mounting.

Figure 1:
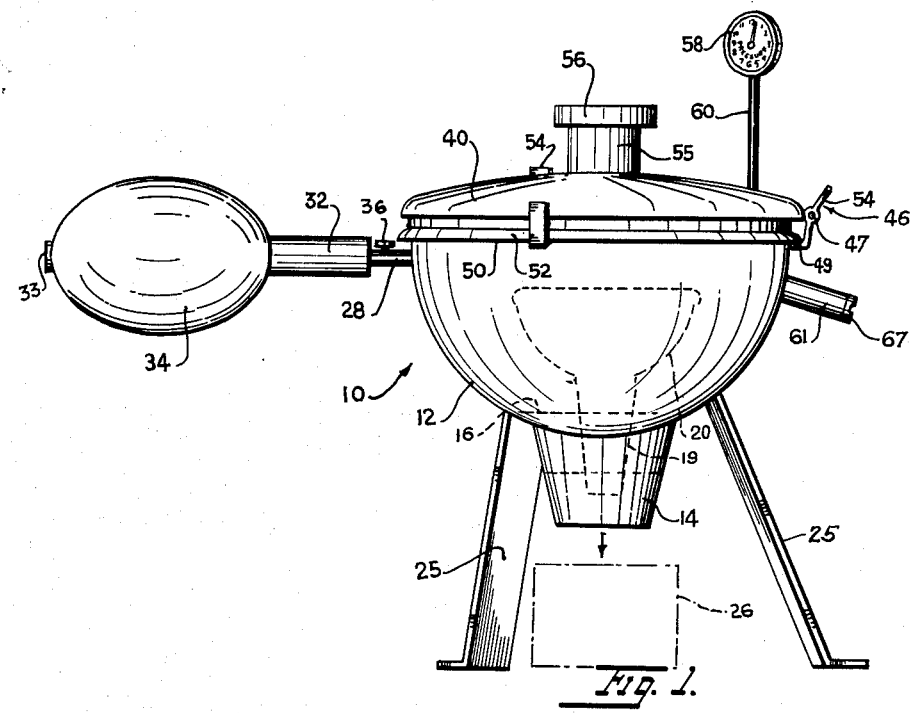
FIG. 1 is a side elevational view of an adapter embodying the invention.
Figure 2:
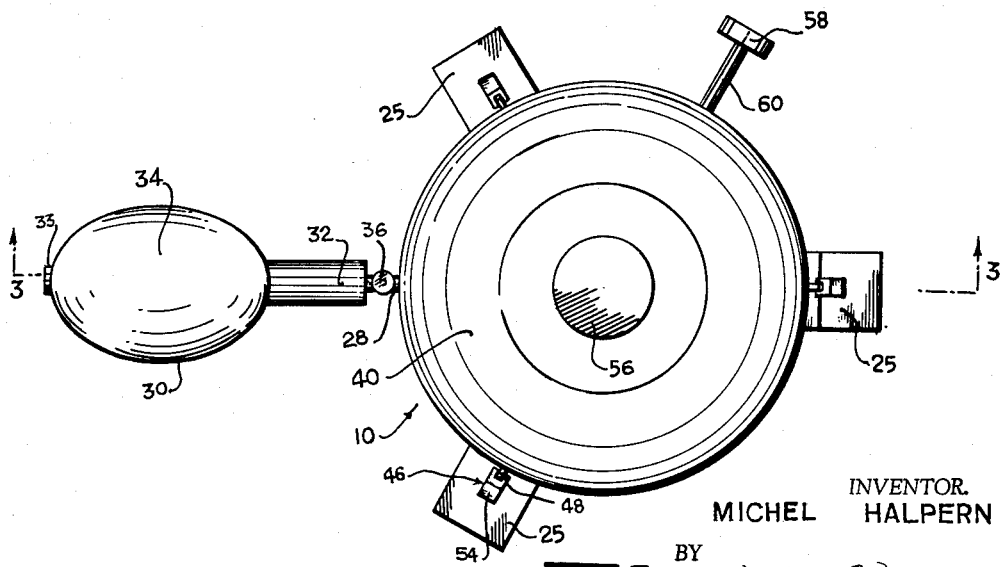
FIG. 2 is a top plan view of the adapter.

Referring in detail to the drawings, in FIG. 1 an adapter 10 made in accordance with one form of the invention is shown applied to a funnel-shaped filtering device 20. The filtering device 20 comprises a one-piece funnel 21 having a substantially conical-shaped body 24 with a tubular stem 19 depending from the bottom end thereof. The body and stem may be formed of glass, such as the glass known in the trade as "Pyrex," fritted glass, Buchner glass, porcelain, plastic or any other suitable material. A perforated foraminous filtering plate 22 is in the conical body 24, and a thin paper disc 23 covers the top of the plate and serves to filter the filtrant placed in the conical body 24 and the filtrant seeps down through the paper disc 23 and the perforations in the plate through the tubular stem 19, into an open top beaker or container 26 disposed below the stem as shown in FIG. 1.

In accordance with the present invention, the adapter 10 is provided for the funnel whereby either atmosphere or gas may be applied directly to the filtrant in the conical body 24. The adapter 10 is formed of metal and has a bowl-shaped body 12 terminating in a conical stem 14. In the stem 14, there is a tubular rubber bearing member 16 extending from the top end of the stem downwardly to a point substantially midway the ends of the stem. The bearing member has an annular flange 17 around its upper end seated on the bottom end of the body 12. Spaced metal legs 25 are welded or otherwise suitably fastened to the bowl-shaped body 12 and depend therefrom for supporting the adapter in an upright position. A nipple 28 is provided near the upper wide open end of the bowl for connection to an external source of pressure. This source may be constituted by a hand pump or atomizer 30. Alternately, there may be provided a tank of compressed gas or a gas pump. The atomizer 30 comprises a hollow bulbous body 34 formed with a laterally extending nozzle 32. Nozzle 32 is frictionally fitted over nipple 28. A ball valve 33 is mounted in the body 34 opposite the nozzle 32 and comprises a tubular body closed at one end and formed with a hole 35 at its other end. A movable ball 31 is adapted to seal the hole 35 to prevent air from escaping when the bulb is squeezed and automatically moves away from the hole to admit air to the bulb when the bulb is released after being manually squeezed. The nipple 28 may be equipped with a stop cock 36 to control exit of the air.

A safety valve 61 is mounted on the body 12 for releasing the pressure from the bowl-shaped body in the event the pressure becomes excessive. The valve includes a valve element 62 pressed by a spring 65 radially inwardly of the bowl to seal hole 64 in valve casing 63. A threaded cap 67 closes the outer side of casing 63. Any kind of conventional safety valve may be used.

A pressure gauge 58 is shown supported on a pipe 60 connected to the bowl for measuring pressure inside the bowl when external pressure is applied. This gauge, however, is only optional.

The bowl-shaped body 12 is open at the top but is provided with a removable, circular, dome-shaped metal closure plate 40 serving as a cover. The plate has an annular recess 42 formed just inside its periphery. A resilient rubber gasket ring 44 is seated in this recess. The ring presses down on the rim of the bowl-shaped body to seal it when the cover is locked on the bowl-shaped body. For this purpose, the rim of the closure plate is provided with a number of circumferentially spaced latches 46. Each latch is pivotally mounted on a pintle 47 carried by an ear 48 extending radially from the closure plate. Each latch 46 has a tooth 49 at its free end which engages under the flat surface 50 of an annular ridge 52 formed on the outside of the bowl-shaped body.

The closure plate can be placed on the bowl-shaped body in any circumferential position and the latches will engage under the ridge by outward pressure on levers 54 of the latches. The resiliency of the gasket ring 44 will insure secure locking of the closure plate on the bowl-shaped body and hermetic sealing at the juncture of the closure plate and bowl-shaped body. The cover will be locked in place quickly to withstand any internal pressure the adapter and filtering funnel are designed for.

The closure plate 40 may be provided with a central opening 53 from which a threaded neck 55 extends upwardly and is adapted to be sealed by a plastic plug 56. When required, the funnel 20 may be filled with filtrant by means of this opening when the closure plate 40 is in locked position. Any conventional quick acting locking mechanism may be used.

The cover 40 may be equipped with a window to inspect the level of the contents of the funnel.

In using the adapter, the funnel 20 is placed inside the adapter with the conical stem 19 of the body 24 seated against and extending through the central bore 18 in the bearing member 16 to the outside of the bearing member. The funnel 20 is then filled with the filtrant and the cover plate 40 next locked in place. The atomizer 30 is then squeezed to force air through the inlet nipple 28 into the bowl-shaped body 12 and directly onto the surface of the filtrant in the funnel 20, the stop cock 36 having first been opened. The air forced therein will force the filtrant down through the paper disc 23, through the perforations in the filtering plate 22 and downwardly through the stem 19 of the funnel 20 into the container 26 placed underneath the adapter as shown in FIG. 1.

If desired, the adapter may be equipped with an outer jacket in order to maintain a desired temperature.

The locking mechanism shown for locking the cover to the body of the adapter facilitates speedy and safe operation. For very high pressures, threading of the cover onto the body of the adapter is necessary. For lower pressures, other types of locks that could be assembled and disassembled very speedily would be used.

Referring now to the modification of the invention shown in FIG. 5, in this form the bottom of the body 12' of the adapter 10' gracefully curves into a short neck portion 70. The body 24' of the funnel 20' has a bottom tapering portion 72 terminating in a short stem 19'. In place of a bearing member such as bearing member 16, a rubber gasket or bushing 74 is interposed between the tapering portion 72 and the juncture between the body portion and neck portion 70. The tapering portion of the body seats on the gasket or bushing at the point indicated at 76 leaving clearance between the top of the gasket or bushing and the tapering portion and between the bottom of the gasket or bushing and the tapering portion. The stem 19' of the funnel extends outwardly of the neck portion 70.

All or most gravitational filtrations where no pressure or suction is used, at the present time, can be accelerated by my improved adapter by applying an extremely light pressure by squeezing the atomizer very gently, or just somewhat less than the force required to burst the wet filter paper. Also, gravity filtration, for which up to now the paper was folded to give a conical shape, or was fluted, can be accomplished now in Buchner funnels, under pressure, taking practically no time at all.

It will be understood that the atomizer, the gauge and the safety valve may be located at any desired position on the adapter as the location is not critical.

Any type of fast locking mechanism may be used.

Any form of supporting means may be used in place of the legs 25.

While I have illustrated and described various embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

An adapter for a funnel-type filter, said adapter comprising a bowl, said bowl having a wide open upper end and curved bottom, a removable cover on the upper open end, means for locking the cover on the upper end of the bowl, an air inlet nipple opening into the bowl for feeding air into the bowl, said round bottom having a central opening, a filter funnel, gasket means supporting said funnel in alignment with said opening inside the bowl, with its discharge end extending outwardly of the opening, means for supporting the bowl in an elevated position above a container so that filtrate passes through said discharge end of the funnel into the container, said cover having an opening therein, and a cap removably secured in said opening, said opening in the cover being disposed in alignment with the funnel for passing filtrant into the funnel when the cover is locked on the bowl and the cap is removed.

References Cited by the Examiner

UNITED STATES PATENTS

| | | | |
|---|---|---|---|
| 1,052,391 | 2/13 | Valerius | 210—416 |
| 1,168,988 | 1/16 | Zimmermann | 210—445 |
| 1,286,639 | 12/18 | House | 210—482 |
| 1,560,266 | 11/25 | Levinthal | 210—451 |
| 1,652,955 | 12/27 | Price | 210—445 |

FOREIGN PATENTS 70,270 10/15 Austria.

OTHER REFERENCES

"Colloid Chemistry," Alexander, vol. 1, 1926, Chemical Catalog Co., Inc., New York, pps. 826–829.

REUBEN FRIEDMAN, *Primary Examiner.*

FRANK W. LUTHER, *Examiner.*